(12) United States Patent
Ikura

(10) Patent No.: US 8,431,052 B2
(45) Date of Patent: Apr. 30, 2013

(54) MANUFACTURING APPARATUS AND METHOD FOR OPTICAL WAVEGUIDE STRUCTURE

(75) Inventor: Kazuyuki Ikura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 13/008,533

(22) Filed: Jan. 18, 2011

(65) Prior Publication Data

US 2011/0174019 A1    Jul. 21, 2011

(30) Foreign Application Priority Data

Jan. 21, 2010   (JP) ................................. 2010-010700

(51) Int. Cl.
*B29D 11/00*    (2006.01)
(52) U.S. Cl.
USPC .......... 264/1.24; 156/64; 264/1.25; 264/1.38; 264/1.7; 264/40.1; 425/112; 425/135; 425/174.4
(58) Field of Classification Search .................... 264/1.1, 264/1.24, 1.25, 2.7, 1.7, 294, 40.1, 1.36, 264/1.38; 425/110, 112, 135, 174.4; 156/60, 156/64
See application file for complete search history.

(56) References Cited

U.S. PATENT DOCUMENTS

2005/0058399 A1* 3/2005 Nishizawa et al. ............. 385/39

FOREIGN PATENT DOCUMENTS

| JP | 2005-115346 A | 4/2005 |
| JP | 2006-7527 A | 1/2006 |
| JP | 2008-158445 A | 7/2008 |

* cited by examiner

*Primary Examiner* — Mathieu D. Vargot
(74) *Attorney, Agent, or Firm* — Fujitsu Patent Center

(57) ABSTRACT

A manufacturing apparatus for an optical waveguide structure including a clad structure having grooves in a curved surface thereof and a clad film attached to the curved surface includes a clad film shape retaining portion that has a curved surface along which the clad film is held, a position checking portion that checks the position of the clad film on the clad film shape retaining portion, and a first position adjusting portion that adjusts the position of the clad film shape retaining portion so that the clad film on the clad film shape retaining portion is disposed at a reference position while checking the position of the clad film with the position checking portion.

5 Claims, 22 Drawing Sheets

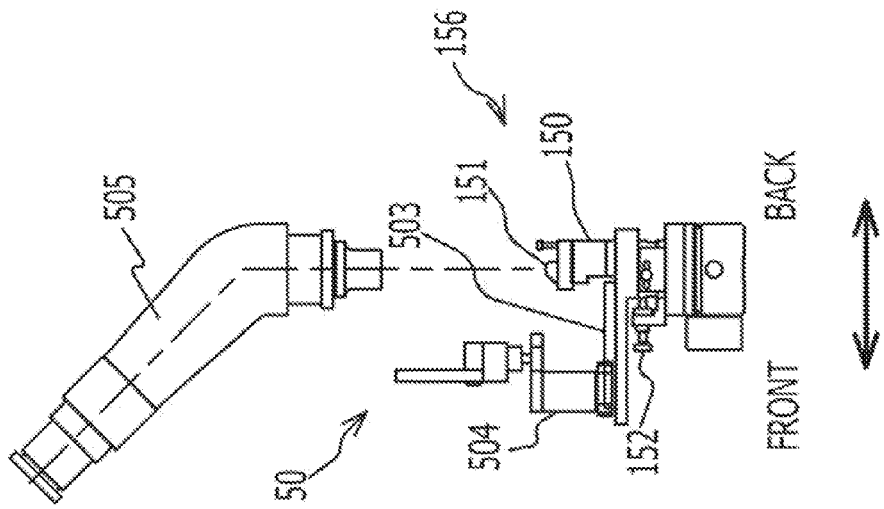
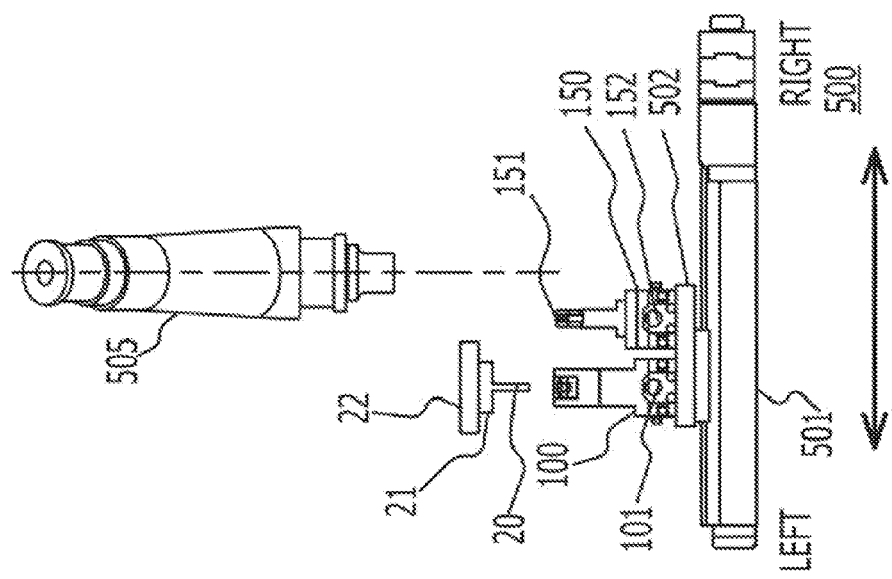
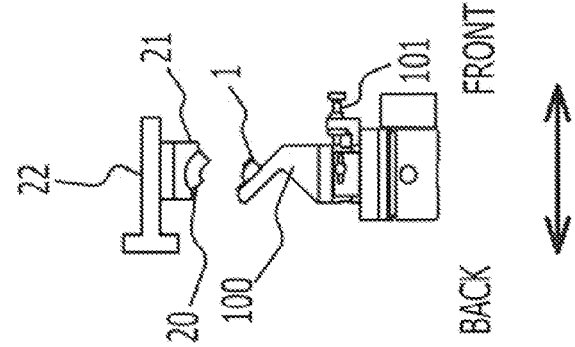

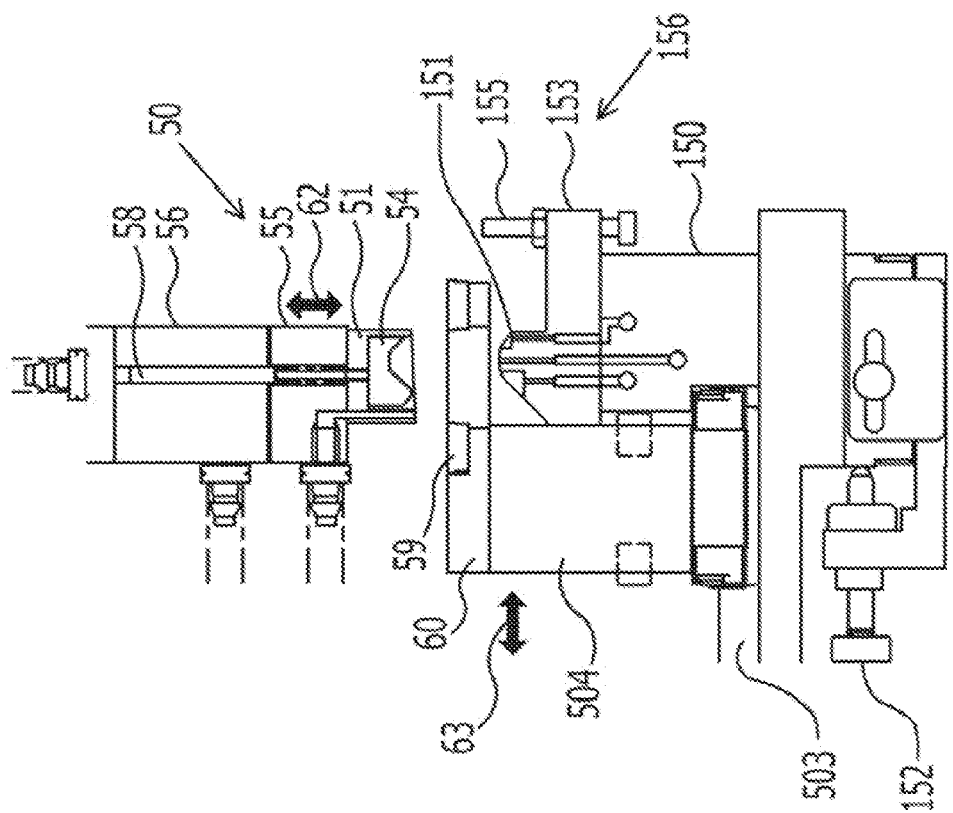
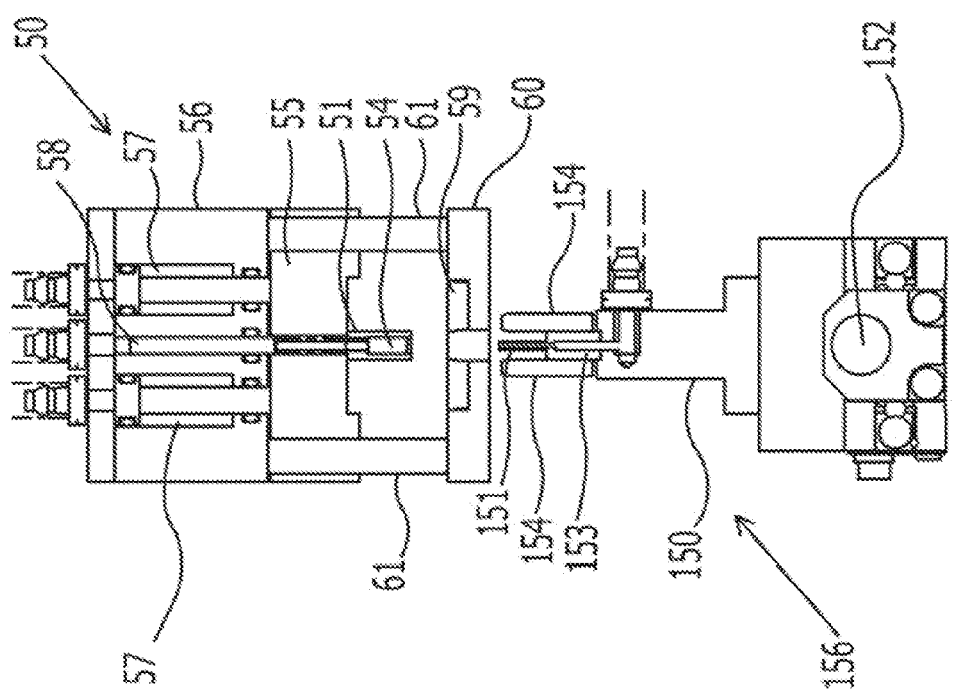

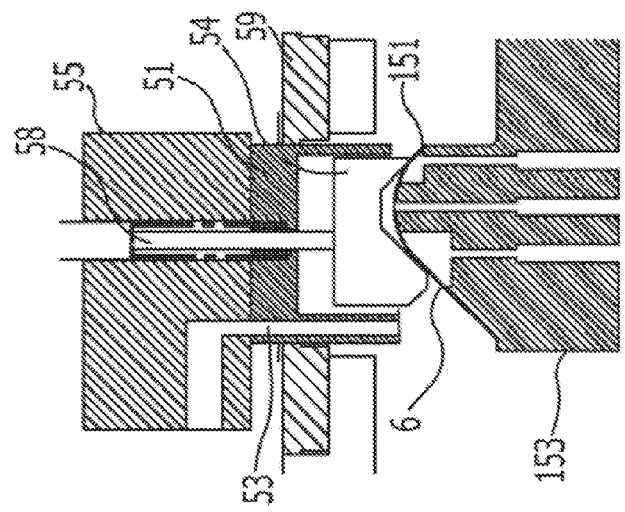
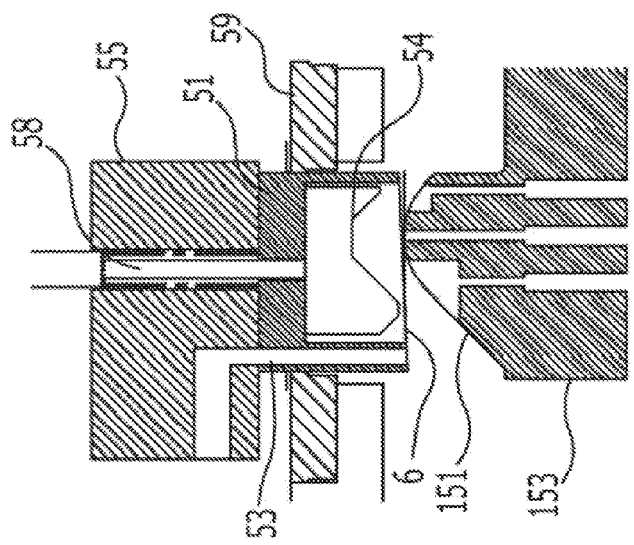
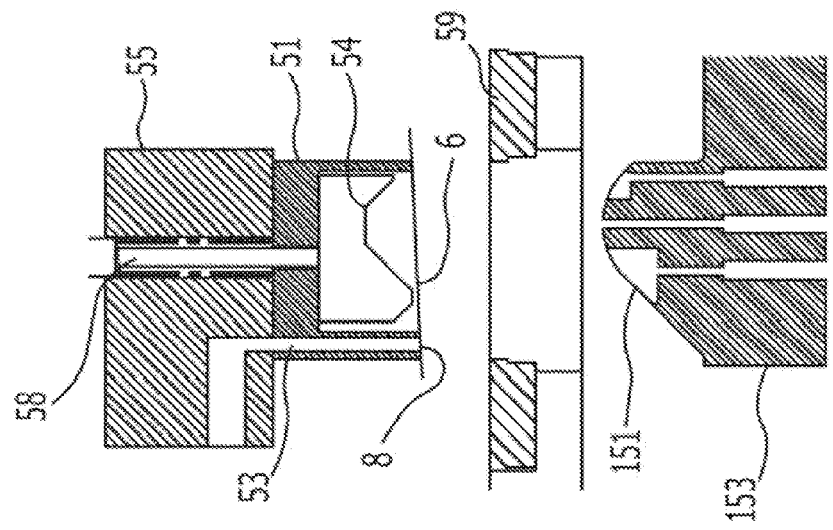

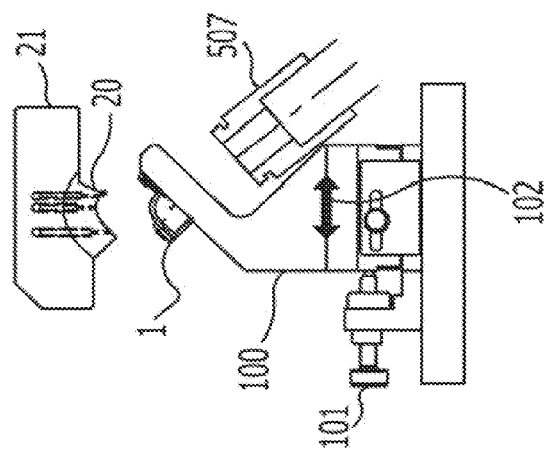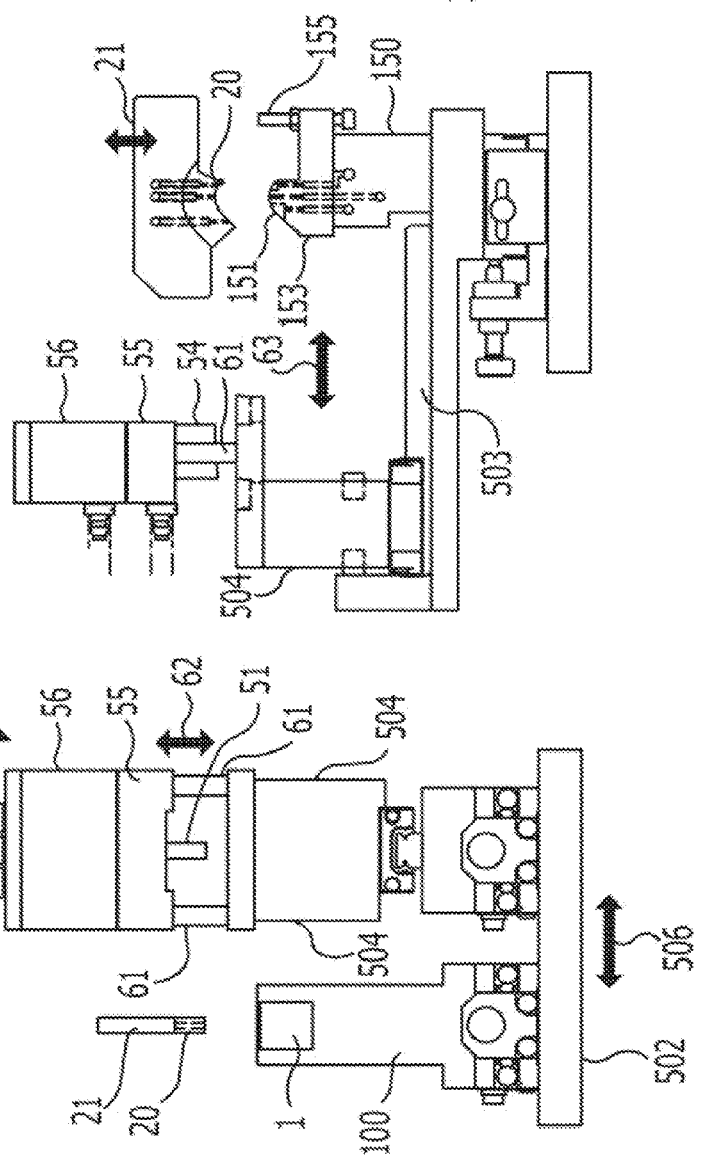

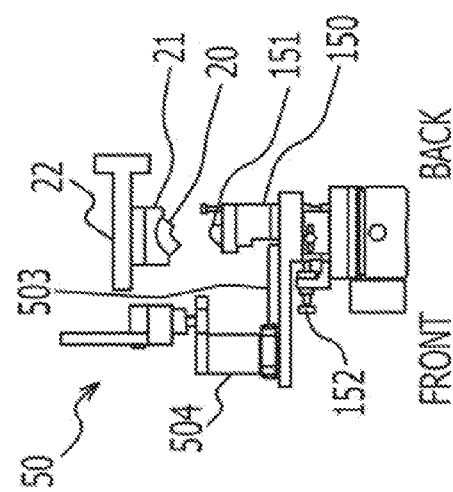
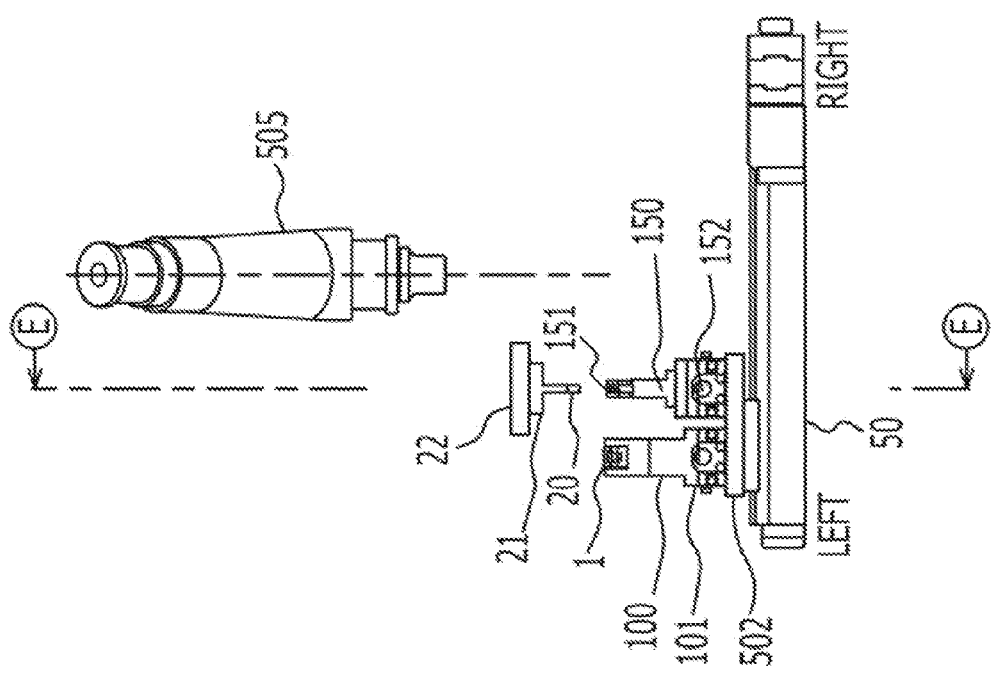

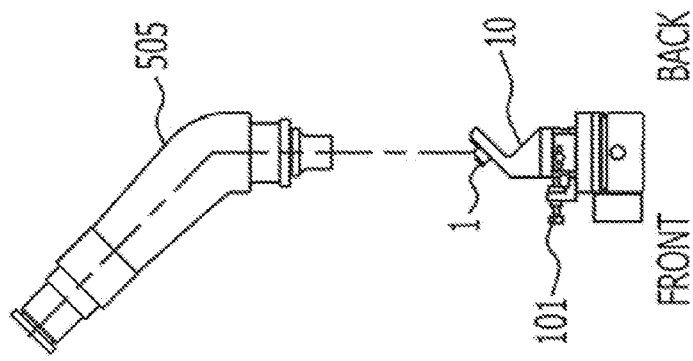
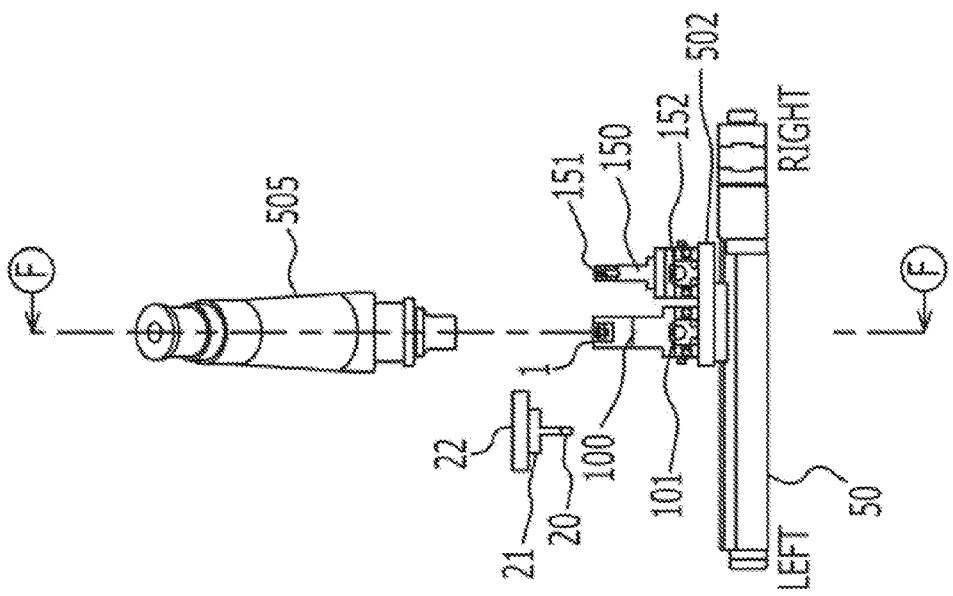
FIG. 19B
FIG. 19A

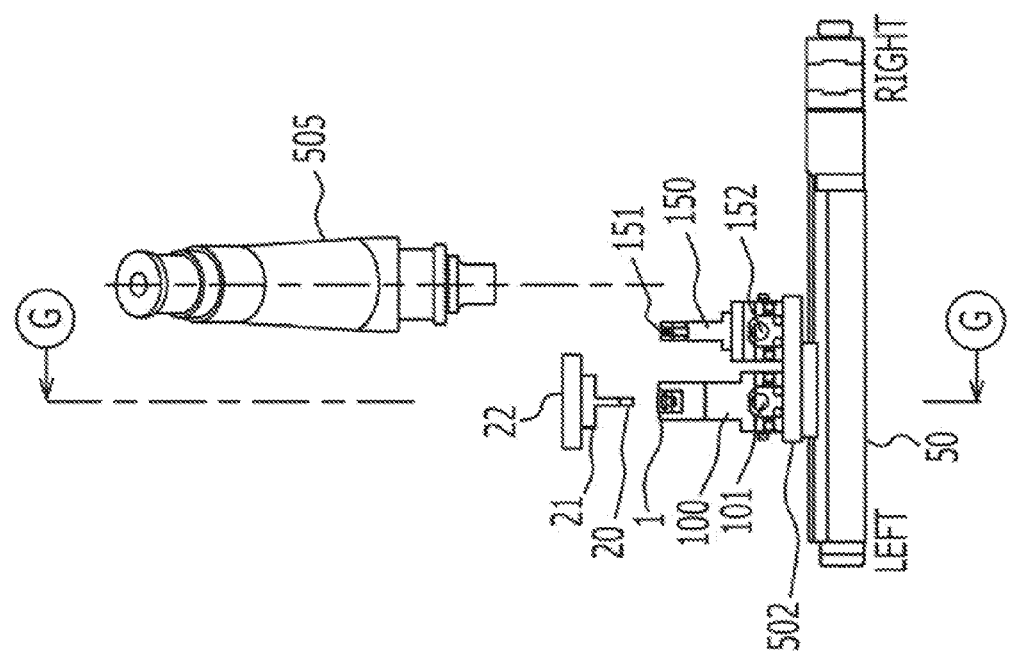
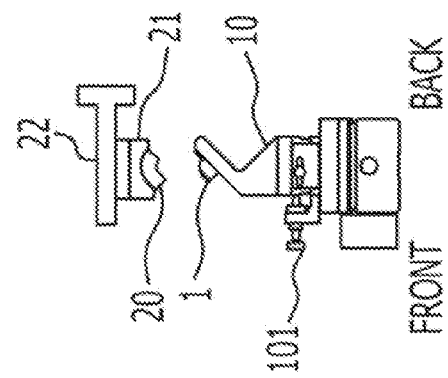
FIG. 21A
FIG. 21B

MANUFACTURING APPARATUS AND METHOD FOR OPTICAL WAVEGUIDE STRUCTURE

CROSS-REFERENCE TO RELATED APPLICATIONS

This application is based upon and claims the benefit of priority of the prior Japanese Patent Application No. 2010-10700, filed on Jan. 21, 2010, the entire contents of which are incorporated herein by reference.

FIELD

The embodiments discussed herein are related to a manufacturing apparatus and a manufacturing method for an optical waveguide structure.

BACKGROUND

A multichannel optical transceiver having a Vertical Cavity Surface Emitting Laser diode, such as a VCSEL (Vertical Cavity Surface Emitting Laser) or a photodiode (photodetector), has been known. In an optical module such as the foregoing multichannel optical transceiver, the light entry surface or the light exit surface of a Vertical Cavity Surface Emitting Laser diode is parallel to the mounting substrate, and therefore light enters or exits perpendicularly to the mounting substrate. When reducing the size or thickness of such an optical module, it is preferable that optical fiber (optical fiber array) be disposed parallel to the mounting substrate. In this case, an end face of the optical fiber is substantially perpendicular to the light entry surface or the light exit surface of the Vertical Cavity Surface Emitting Laser diode. For this reason, it is necessary to bend the path (optical path) of light perpendicularly entering or exiting the light entry surface or the light exit surface of the Vertical Cavity Surface Emitting Laser diode mounted on the substrate at about 90 degrees and to optically connect the optical fiber and the Vertical Cavity Surface Emitting Laser diode. Japanese Laid-open Patent Publication No. 2005-115346 proposes a technique in which an optical waveguide structure having an optical waveguide on a surface curved substantially at right angle is used in order to sharply bend the path of light in a narrow space in an apparatus such as an optical transceiver, and light entering or exiting a Vertical Cavity Surface Emitting Laser diode is guided along the curved surface and coupled to an optical fiber array.

Japanese Laid-open Patent Publication No. 2008-158445 discloses a method for uniformly filling with liquid core without mixing air bubbles in the manufacturing of an optical waveguide structure.

In the manufacturing of an optical waveguide structure of Japanese Laid-open Patent Publication No. 2008-158445, a clad film needs to be disposed on a curved surface so as to be coplanar with the end face where the optical path is exposed.

SUMMARY

According to an embodiment, a manufacturing apparatus for an optical waveguide structure including a clad structure having grooves in a curved surface thereof and a clad film attached to the curved surface includes a clad film shape retaining portion that has a curved surface along which the clad film is held, a position checking portion that checks the position of the clad film on the clad film shape retaining portion, a first position adjusting portion that adjusts the position of the clad film shape retaining portion so that the clad film on the clad film shape retaining portion is disposed at a reference position while checking the position of the clad film with the position checking portion, a pressing portion having an elastic body that has a curved surface corresponding to the curved surface of the clad film shape retaining portion and to which the clad film held by the clad film shape retaining portion is transferred and that presses the transferred clad film against the curved surface of the clad structure, a clad structure holding portion that holds the clad structure and can face the position checking portion and the pressing portion in place of the clad film shape retaining portion, and a second position adjusting portion that adjusts the position of the clad structure holding portion so that the clad structure held by the clad structure holding portion is disposed at the reference position while checking the position of the clad structure with the position checking portion.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1C show a manufacturing apparatus of an embodiment.

FIG. 8A is a front view of the shape retaining unit and the cutting unit included in the manufacturing apparatus.

FIG. 8B is a side view of the shape retaining unit and the cutting unit included in the manufacturing apparatus.

FIGS. 9A to 9C show how the cutting unit cuts out the clad film while causing the clad film to be attached by suction to the shape retaining support.

FIGS. 10A to 10C show a third stage that holds the clad structure, and a pressing head that holds an elastic body.

FIGS. 18A and 18B show the state of the manufacturing apparatus when the clad film held by the shape retaining support is transferred to the elastic body.

FIGS. 19A and 19B show the state of the manufacturing apparatus when the positioning of the clad structure is performed.

FIGS. 21A and 21B show the state of the manufacturing apparatus when the clad film held by the elastic body is placed on the clad structure.

DESCRIPTION OF EMBODIMENTS

Some of the Figures may not be completely drawn to scale. In some of the Figures, details may be omitted, or a component overlapping another component may be removed.

First, the configuration of a manufacturing apparatus for an optical waveguide structure (hereinafter simply referred to as "manufacturing apparatus") 500 of this embodiment will be outlined with reference to the drawings.

Figure 3:
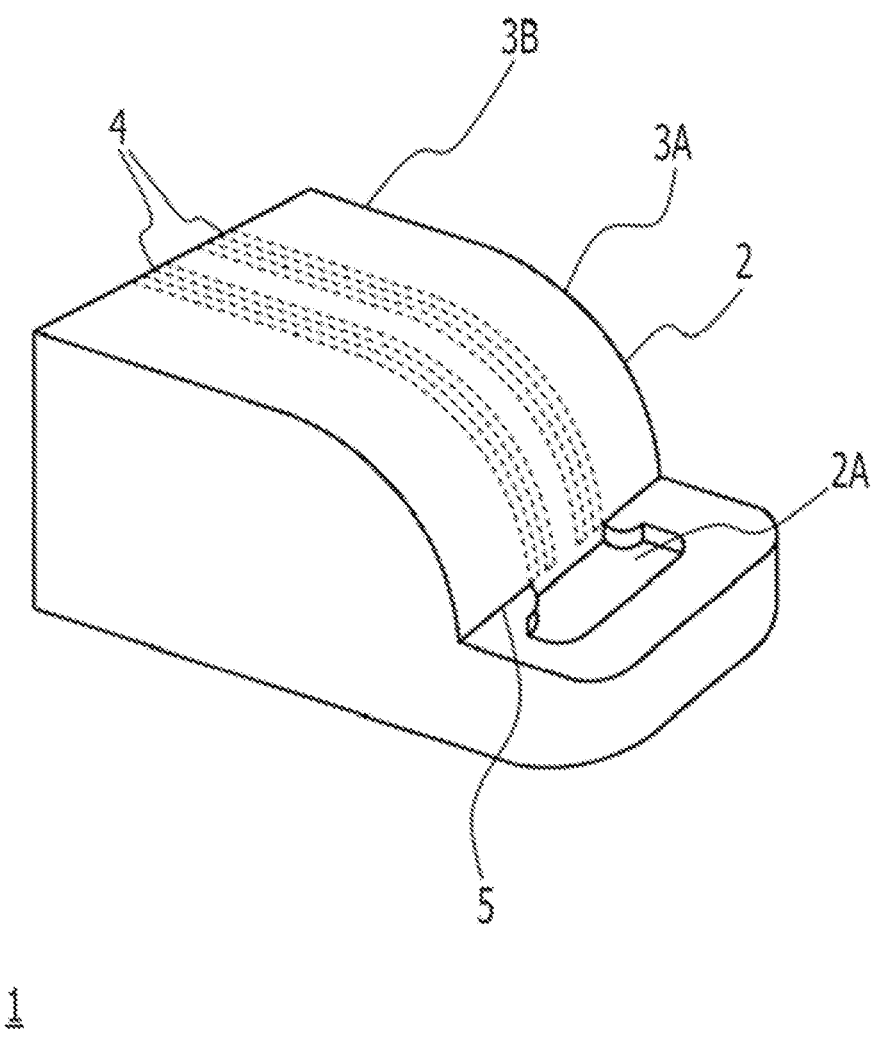
FIG. 3 is a perspective view of a clad structure.
Figure 4:
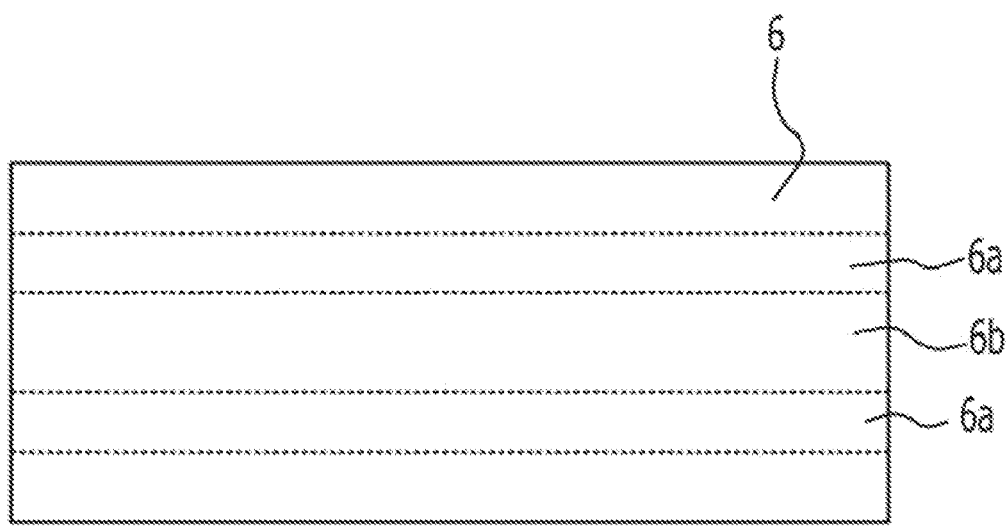
FIG. 4 is a plan view of a clad film.

The manufacturing apparatus 500 shown in FIGS. 1A to 1C is an apparatus for manufacturing an optical waveguide structure 200 including a clad structure 1 having grooves 4 formed in a curved surface 3A as shown in FIG. 3 and a clad film 6 shown in FIG. 4 and attached to the curved surface 3A. In the following description, for ease of description, the front, back, left, and right of the manufacturing apparatus 500 will be defined as shown in FIGS. 1A to 1C.

The manufacturing apparatus 500 has a first stage 502 placed on a first rail 501 extending in the left-right direction. The first stage 502 can move on the first rail 501 in the left-right direction. The manufacturing apparatus 500 further has a second stage 504 placed on a second rail 503 extending in the front-back direction. The second stage 504 can move on the second rail 503 in the front-back direction.

On the first stage 502, a third stage 100 that holds the clad structure 1 and a fourth stage 150 provided with a shape retaining support 151 for the clad film 6 are placed in parallel.

The shape retaining support 151 corresponds to a clad film shape retaining portion. The shape retaining support 151 has a curved surface as shown in the figure and holds the clad film 6 along this curved surface. The clad film 6 is held by suction.

The manufacturing apparatus 500 has a microscope 505 disposed so as to be able to face the shape retaining support 151. The microscope 505 corresponds to a position checking portion. That is to say, by observing through the microscope 505, the position of the clad film 6 on the shape retaining support 151 can be checked. The microscope 505 is fixed, and the position of the microscope 505 is used as a reference for the positioning of each part.

The manufacturing apparatus 500 has a first adjusting mechanism 152 that adjusts the position of the shape retaining support 151 so that the clad film 6 on the shape retaining support 151 is disposed at the reference position while checking the position of the clad film 6 with the microscope 505. The first adjusting mechanism 152 corresponds to a first position adjusting portion, and more specifically, it adjusts the position in the front-back direction of the fourth stage 150.

The manufacturing apparatus 500 has a pressing head 21 disposed so as to be able to face the shape retaining support 151. The pressing head 21 corresponds to a pressing portion.

The pressing head 21 is attached to a frame 22 and disposed in parallel with the microscope 505. The pressing head 21 has an elastic body 20. The elastic body 20 has a curved surface corresponding to the curved surface of the shape retaining support 151. The clad film 6 held by the shape retaining support 151 is transferred to the elastic body 20. The transferred clad film 6 is then pressed against the curved surface of the clad structure 1. For this purpose, the pressing head 21 can be moved up and down by a drive mechanism.

As described above, on the first stage 502, a third stage 100 that holds the clad structure 1 and a fourth stage 150 provided with a shape retaining support 151 for the clad film 6 are placed in parallel. Thus, by being moved in the left-right direction, the third stage 100 can face the microscope 505 and the pressing head 21 in place of the fourth stage 150 on which the shape retaining support 151 is placed.

The manufacturing apparatus 500 has a second adjusting mechanism 101 that adjusts the position of the third stage 100 so that the clad structure 1 held by the third stage 100 is disposed at the reference position while checking the position of the clad structure 1 with the microscope 505. The second adjusting mechanism 101 corresponds to a second position adjusting portion, and more specifically, it adjusts the position in the front-back direction of the third stage 100.

The manufacturing apparatus 500 further has a cutting unit 50. The cutting unit 50 is an example of a clad film feeding portion and cuts out a clad film 6 of a desired size from a clad film sheet 8 while feeding the clad film 6 onto the curved surface of the shape retaining support 151. The clad film sheet 8 indicates a sheet of clad film shown in FIG. 9A before a clad film 6 is cut out. The cutting unit 50 is mounted on the second stage 504 and can move in the front-back direction.

Figure 2A:
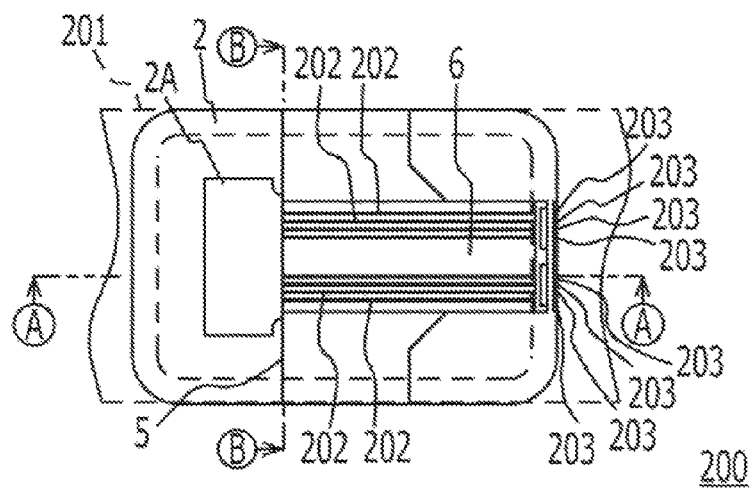
FIG. 2A is a plan view of an optical waveguide structure.
Figure 2B:
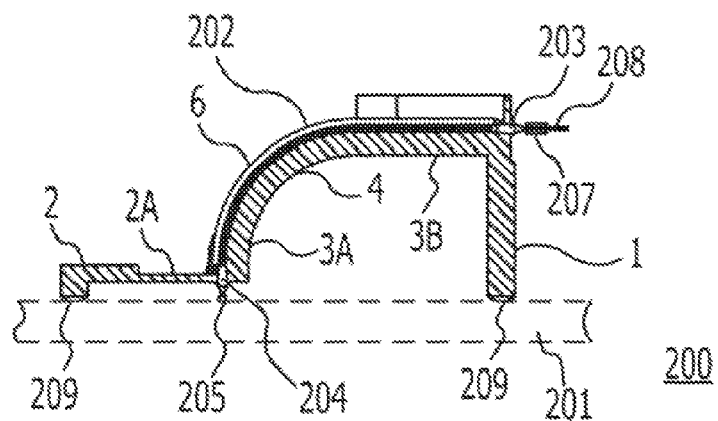
FIG. 2B is a sectional view taken along line A-A of FIG. 2A.
Figure 2C:
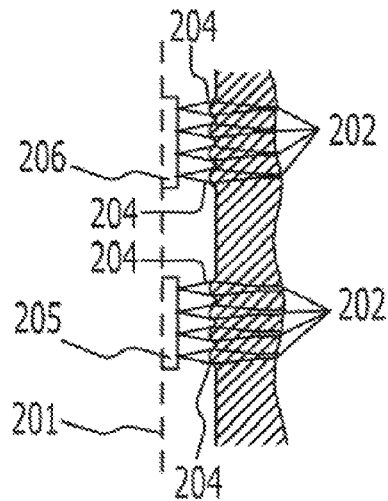
FIG. 2C is a sectional view taken along line B-B of FIG. 2A.

The configuration of the manufacturing apparatus 500 is as outlined above. The optical waveguide structure 200 manufactured with the manufacturing apparatus 500 of this embodiment will be described with reference to the drawings. FIGS. 2A to 2C are explanatory views of the optical waveguide structure 200. FIG. 2A is a plan view, FIG. 2B is a sectional view taken along line A-A of FIG. 2A, and FIG. 2C is an explanatory view showing a part of a section taken along line B-B of FIG. 2A. FIG. 3 is a perspective view of the clad structure 1. FIG. 4 is a plan view of the cut out clad film 6.

The clad structure 1 has a curved surface 3A and a flat surface 3B as shown in FIG. 3. From the curved surface 3A to the flat surface 3B, grooves 4 are provided. The grooves 4 are filled with a liquid core material, and optical waveguides 202 are formed as shown in FIGS. 2A and 2B. The clad structure 1 has a recess 2A formed therein. A region where the recess 2A is formed adjoins the curved surface 3A with a corner line 5 therebetween. To the clad structure 1, the clad film 6 is attached so as to cover the optical waveguides 202 from the curved surface 3A to the flat surface 3B. As shown in FIG. 4, the clad film 6 is divided into two optical waveguide regions 6a covering the grooves 4 and a suctioned region 6b between the optical waveguide regions 6a. However, dividing lines or the like are not provided.

At the ends of each optical waveguide 202, microlenses 203 and 204 are provided. More specifically, a microlens 203 is provided at the end on the flat surface 3B side, and a microlens 204 is provided at the end on the curved surface 3A side. An optical connector 207 is placed opposite the microlens 203. To the optical connector 207 is connected an optical fiber 208. On the other hand, in the recess 2A of the clad structure 1, light receiving elements 205 and 206 are provided so as to face the microlenses 204 as shown in FIGS. 2B and 2C.

The foregoing optical waveguide structure 200 is attached to a substrate 201 with a leg portion 209 provided in the clad structure 1 therebetween as shown in FIG. 2B.

Next, the positional relationship between the optical waveguides 202 and the clad film 6 will be described with reference to FIGS. 5A to 5C.

Figure 5A:
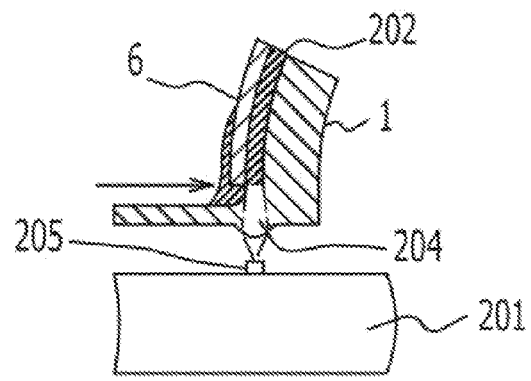
FIGS. 5A to 5C show the alignment of optical waveguides with the clad film.

As shown in FIG. 5A, the end of the clad film 6 is ideally aligned with the ends of the optical waveguides 202. When the end of the clad film 6 is aligned with the ends of the optical waveguides 202, light travelling through the optical waveguides 202 can be appropriately input into the light receiving element 205. On the other hand, light output from the light receiving element 206 enters the optical waveguides 202.

Figure 5B:
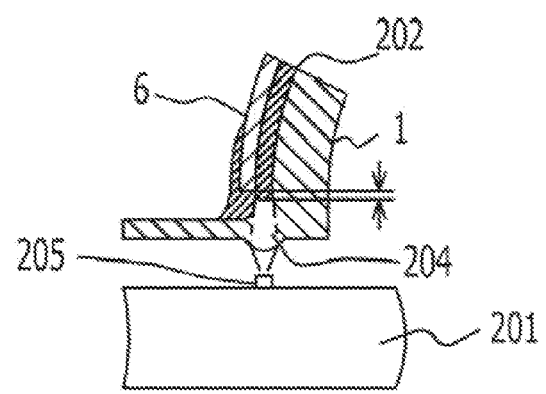
Figure 5C:
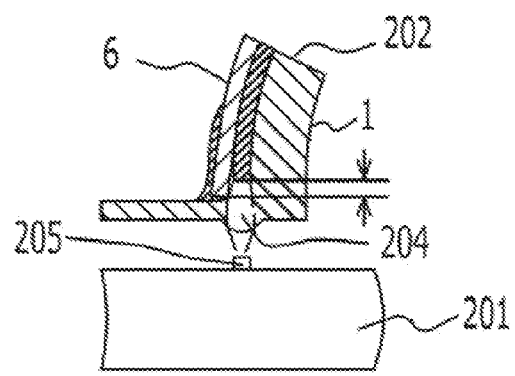

If the clad film 6 is shorter than the optical waveguides 202 as shown in FIG. 5B or the clad film 6 is longer than the optical waveguides 202 as shown in FIG. 5C, appropriate input and output of light are not performed. As described above, at the ends of the optical waveguides 202 where the optical waveguides 202 are exposed, the clad film 6 needs to be appropriately aligned.

Figure 6:
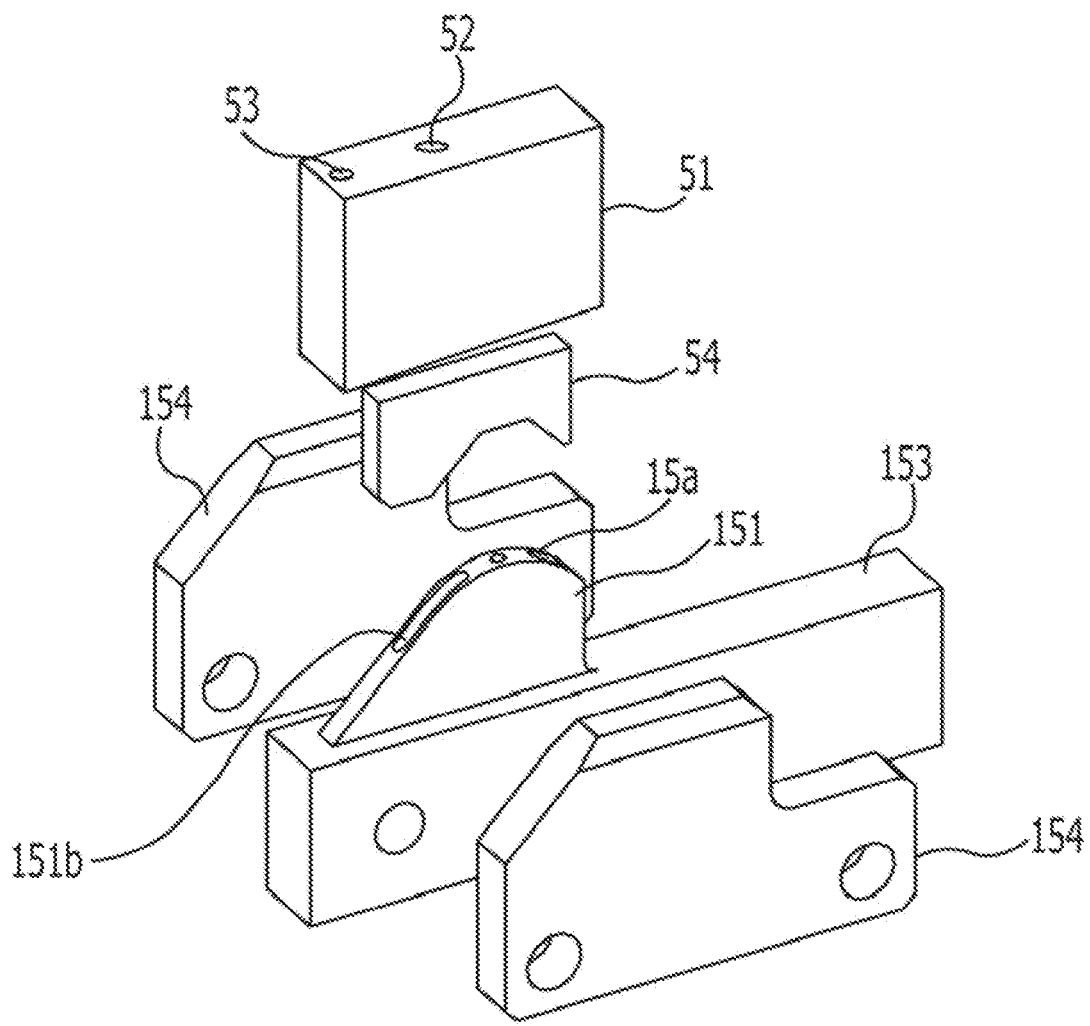
FIG. 6 is an exploded perspective view of part of a shape retaining unit including a shape retaining support and part of a cutting unit.
Figure 7:
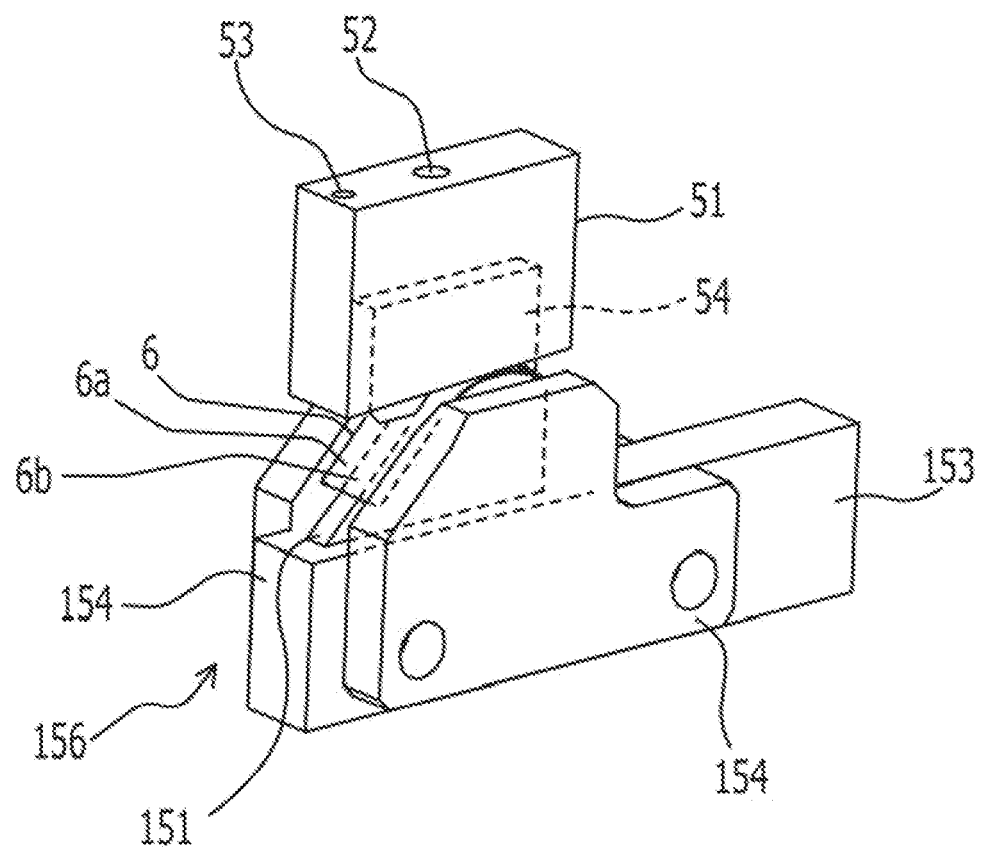
FIG. 7 is a perspective view of part of the shape retaining unit and part of the cutting unit included in the manufacturing apparatus.

The configuration of each part of the manufacturing apparatus 500 will be described in detail. First, with reference to FIGS. 6, 7, 8A, 8B, 9A, 9B, and 9C, a shape retaining unit 156 including the shape retaining support 151, and the cutting unit 50 will be described. FIG. 6 is an exploded perspective view of part of the shape retaining unit 156 including the shape retaining support 151 and part of the cutting unit 50. FIG. 7 is a perspective view of part of the shape retaining unit 156 and part of the cutting unit 50 included in the manufacturing apparatus 500. FIGS. 8A and 8B are explanatory views of the shape retaining unit 156 and the cutting unit 50 included in the manufacturing apparatus 500. FIG. 8A is a front view, and FIG. 8B is a side view. FIGS. 9A to 9C are explanatory views showing how the cutting unit 50 cuts out the clad film 6 while causing the clad film 6 to be attached by suction to the shape retaining support 151

The shape retaining support 151 is disposed on a center block 153 as shown in FIGS. 6 and 7. On both sides of the center block 153, side blocks 154 are disposed. Thus, the shape retaining unit 156 are formed. The side blocks 154 function to guide the side edges of the clad film 6. The position accuracy required of the side edges of the clad film 6 is lower than the position accuracy required of the ends of the optical waveguides 202. Therefore, positioning by the side blocks 154 is enough to obtain the required accuracy. In the curved surface of the shape retaining support 151, suction holes 151a and 151b are provided. By being suctioned by the suction holes 151a and 151b, the clad film 6 is held on the shape retaining support 151. The foregoing shape retaining unit 156 is mounted on the fourth stage 150 as shown in FIGS. 1A to 1C. As shown in FIG. 8B, a stopper 155 is attached to the center block 153. The stopper 155 substantially prevents the pressing head 21 to be described later from excessively pressing.

The cutting unit 50 has a punch block 51 and a pusher block 54 disposed inside the punch block 51 as shown in FIGS. 6 and 7. As shown in FIGS. 8A and 8B, the punch block 51 is provided with a hole 52 through which a drive shaft 58 is passed that is connected to the pusher block 54. In addition, the punch block 51 is provided with an air passage 53 for the pusher block 54 to suction the clad film 6. The foregoing punch block 51 and pusher block 54 are placed in the manufacturing apparatus 500 as shown in FIGS. 8A and 8B.

The punch block 51 is attached to the lower end of a slider block 55 as shown in FIGS. 8A and 8B. The slider block 55 is slidably supported by a pair of guide rods 61. The cutting unit 50 has a cylinder case block 56 that has cylinders 57 inside. The cylinders 57 are connected to the slider block 55 and drive the slider block 55 as indicated by an arrow 62. In addition, the cutting unit 50 has a die stage 60 that has a die 59. The cylinder case block 56 and the die stage 60 are connected by the guide rods 61. The cylinder case block 56 supports the drive shaft 58 connected to the pusher block 54. The foregoing cutting unit 50 is mounted on the second stage 504 and can move in the front-back direction indicated by an arrow 63.

The operation of the above-described cutting unit 50 will be described with reference to FIGS. 9A to 9C. First, as shown in FIG. 9A, a clad film sheet 8 is attached by suction to the punch block 51. Next, as shown in FIG. 9B, the cutting unit 50 pushes down the slider block 55 and cuts out the clad film 6 by the shear force between the punch block 51 and the die 59 while pressing the clad film 6 against the shape retaining support 151. After that, as shown in FIG. 9C, the cutting unit 50 drives the drive shaft 58, thereby pushes out the pusher block 54, and presses the cut out clad film 6 against the shape retaining support 151. In this state, by suctioning the clad film 6, the clad film 6 is held on the shape retaining support 151.

Next, the third stage 100 holding the clad structure 1, and the pressing head 21 will be described. FIGS. 10A to 10C are explanatory views showing the third stage 100 that holds the clad structure 1, and the pressing head 21 that holds the elastic body 20, and their surroundings. Although the position of the pressing head 21 is fixed, the pressing head 21 can face the clad structure 1 and the shape retaining support 151 because the first stage 502 moves in the left-right direction.

Figure 11:
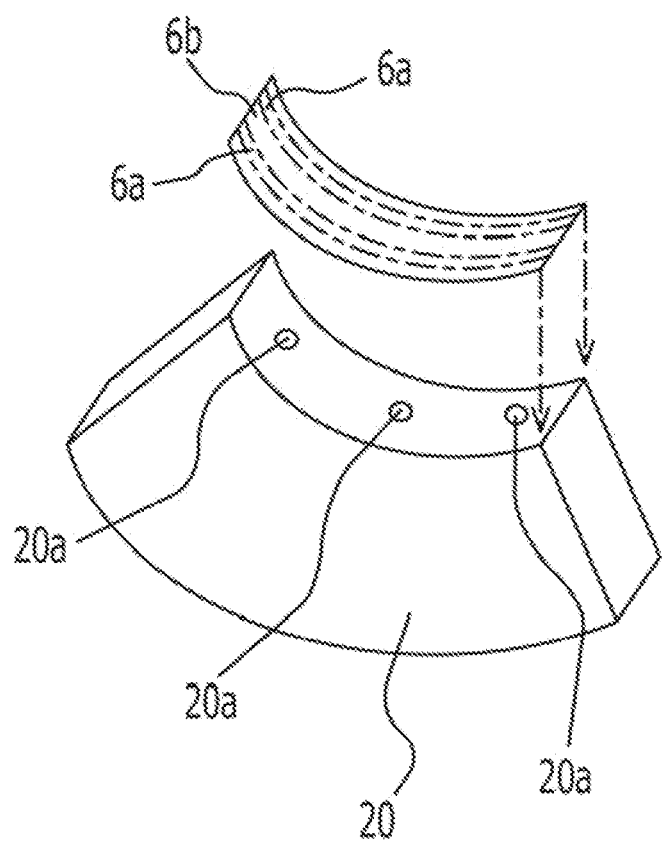
FIG. 11 shows how the clad film is suctioned by the elastic body.

The foregoing pressing head 21 has an elastic body 20. Specifically, the elastic body 20 is made of silicone. The pressing head 21 is connected to a suction mechanism. The elastic body 20 can hold by suction the clad film 6. That is to say, the elastic body 20 has suction holes 20a in a curved surface thereof as shown in FIG. 11 and suctions the clad film 6. At this time, the suctioned region 6b of the clad film 6 is suctioned.

Figure 12:
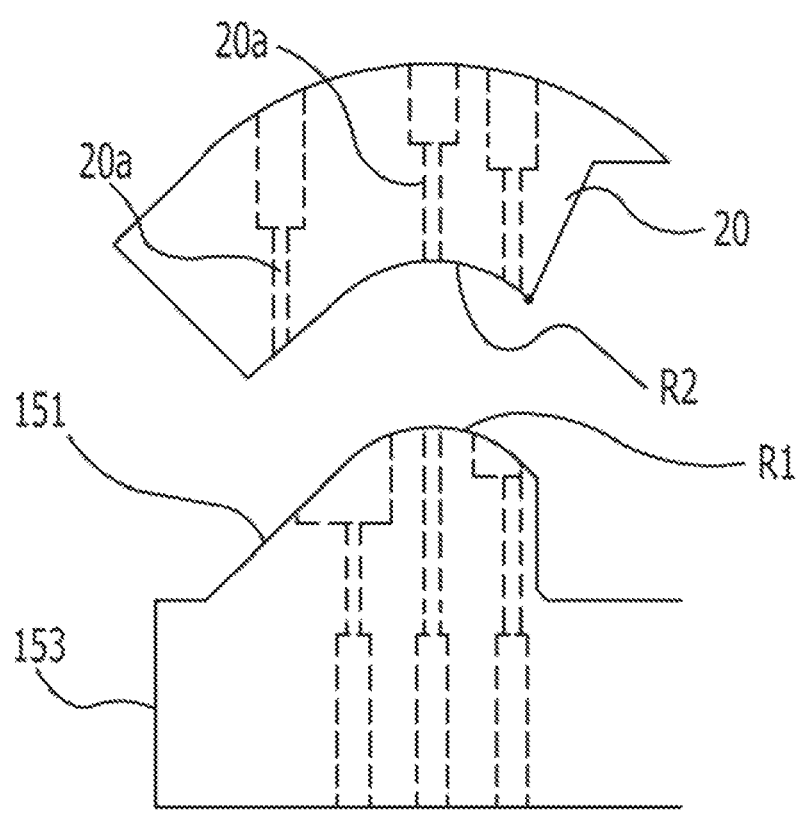
FIG. 12 shows the shape of the shape retaining support and the shape of the elastic body.

The curvature of the curved surface of the shape retaining support 151 and the curvature of the curved surface of the elastic body 20 will be described with reference to FIG. 12. The curvature R1 of the curved surface of the shape retaining support 151 and the curvature R2 of the curved surface of the elastic body 20 are set so that R1<R2. The curvature of the curved surface of the shape retaining support 151 corresponds to the curvature of the curved surface of the clad structure 1. Because R1<R2, the elastic body 20 can be gradually pressed against the curved surface of the shape retaining support 151 or the curved surface of the clad structure 1. Thus, the breakage and displacement of the clad film 6 can be substantially prevented.

The third stage 100 is a transparent member and has a UV (UltraViolet) irradiator on the underside thereof. This ultraviolet cures the liquid core material with which the grooves 4 are filled, and thereby forms the optical waveguides 202.

The foregoing third stage 100 moves to a position opposite the microscope 505, where the position of the clad structure 1 is adjusted, and then moves to a position opposite the pressing head 21, where the clad film 6 is attached to the clad structure 1.

Next, an example of a manufacturing method for an optical waveguide structure using the foregoing manufacturing apparatus 500 will be described.

Figure 13:
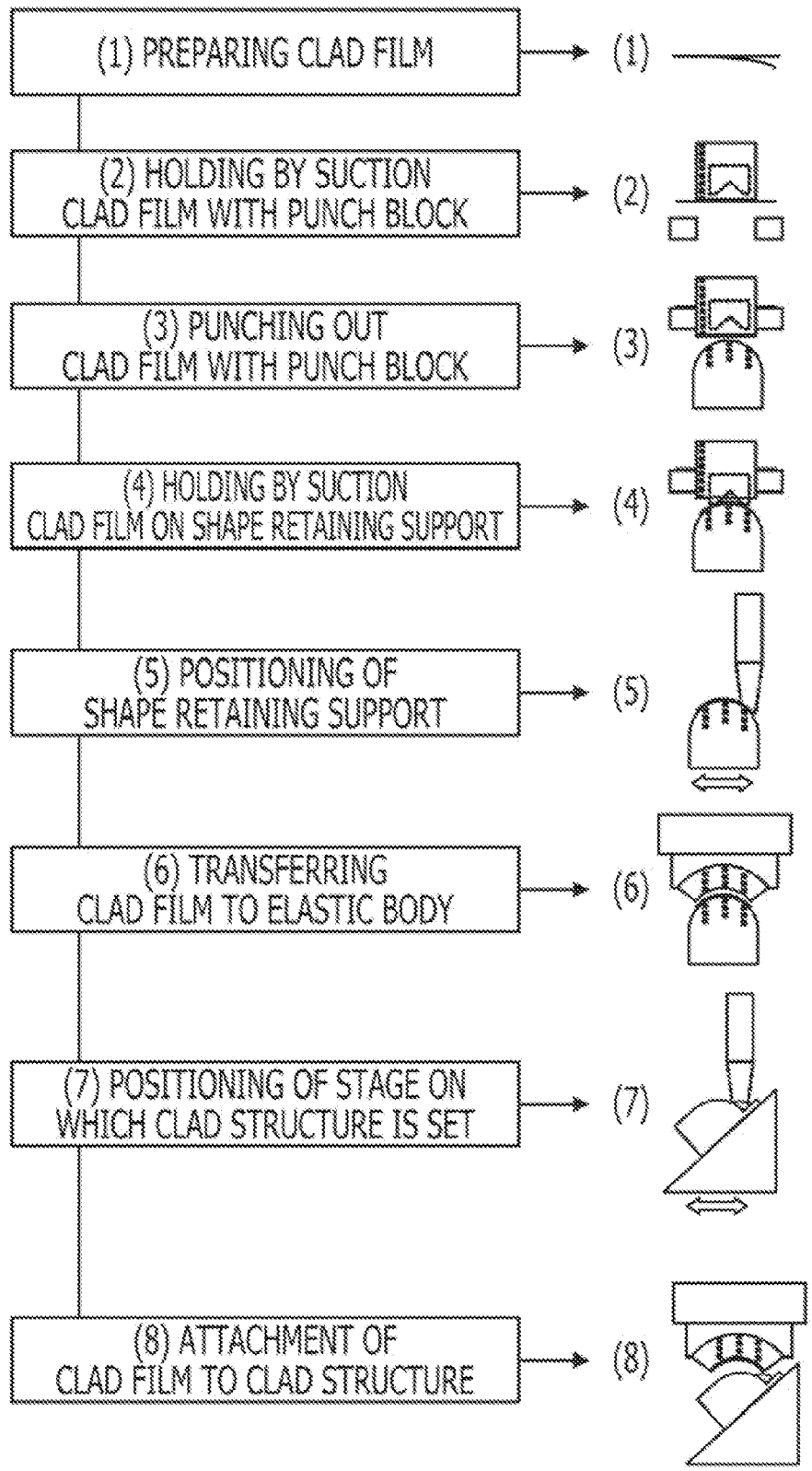
FIG. 13 shows a manufacturing method for an optical waveguide structure.

FIG. 13 is a process chart showing an example of a manufacturing method for an optical waveguide structure. First, a clad film sheet 8 is prepared. A protective film attached to the clad film sheet 8 is peeled off. The protective film may be peeled off after the attachment to the clad structure 1 is completed.

Next, the clad film sheet 8 is held by suction by the punch block 51. The punch block 51 is lowered, and the clad film 6 is cut out by punching. The pusher block 54 is pushed out, and the cut out clad film 6 is fed onto the shape retaining support 151 and held by suction.

Figure 14B:
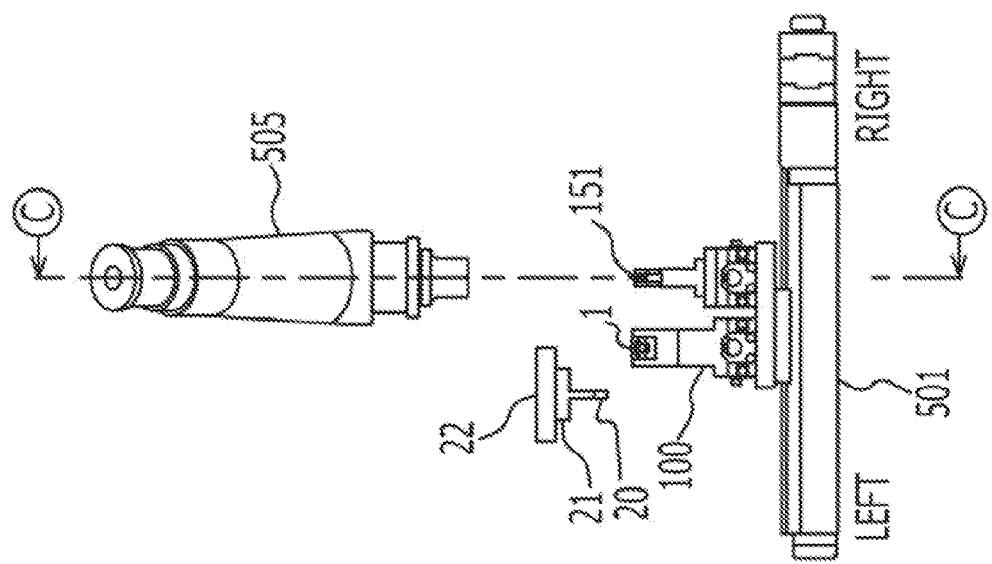
FIGS. 14A and 14B show the state of the manufacturing apparatus when the clad film is cut and held by suction by the shape retaining support.
Figure 14A:
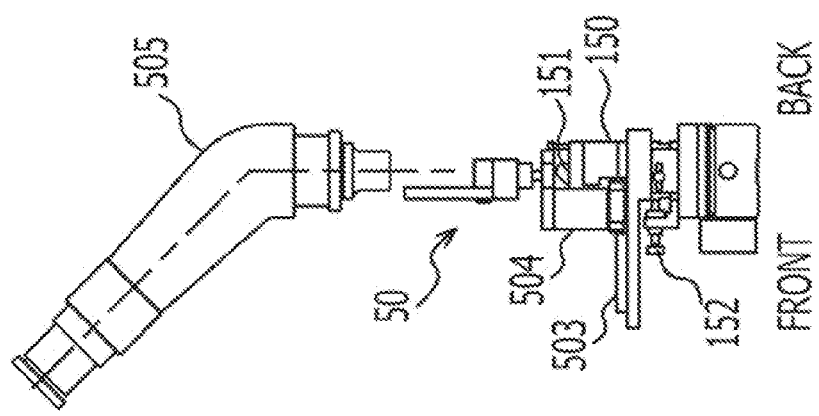

The above steps are performed in a state shown in FIGS. 14A and 14B. That is to say, they are performed in a state where the second stage 504 on which the cutting unit 50 is mounted is moved backward, and the cutting unit 50 is located over the fourth stage 150 on which the shape retaining support 151 is mounted.

Figure 15B:
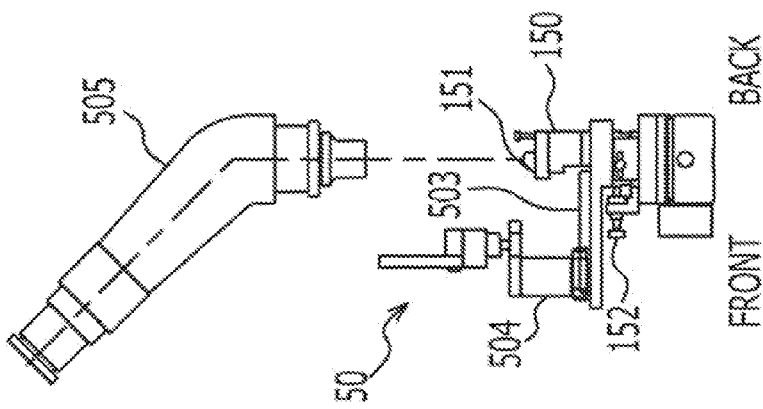
FIGS. 15A and 15B show the state of the manufacturing apparatus when the positioning of the shape retaining support is performed.
Figure 15A:
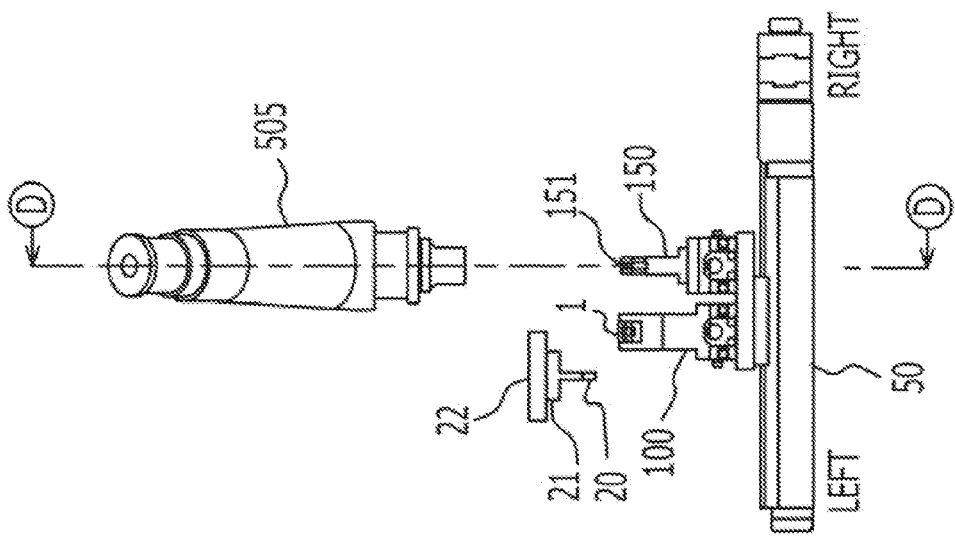

Next, the positioning of the shape retaining support 151 is performed. This step is performed in a state shown in FIGS. 15A and 15B. That is to say, it is performed in a state where the fourth stage 150 is located under the microscope 505, and the shape retaining support 151 faces the microscope 505.

Figure 16:
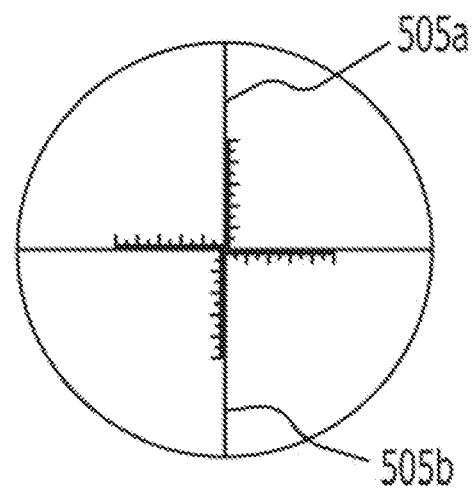
FIG. 16 shows axes provided in a microscope.
Figure 17A:
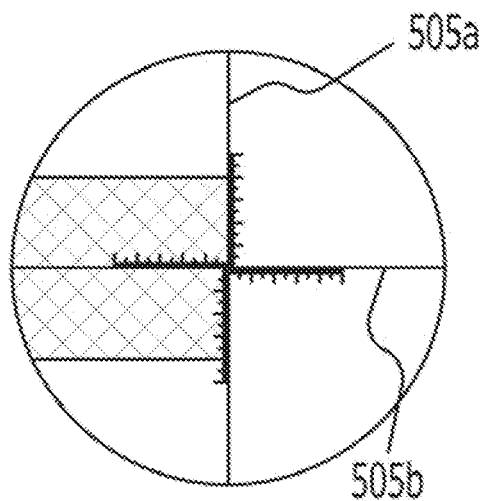
FIGS. 17A to 17C show a state where an end of the clad film is aligned with an axis in the microscope.
Figure 17B:
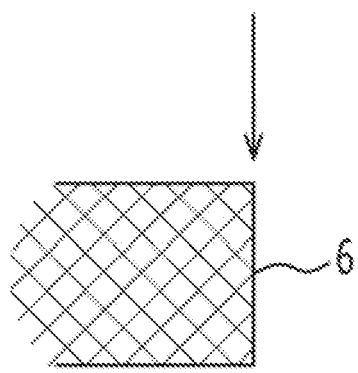
Figure 17C:
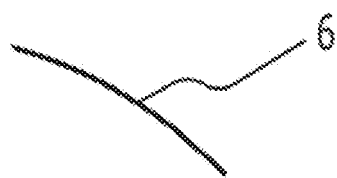

FIG. 16 is an explanatory view showing graduations provided in the microscope 505. In the microscope 505, a first axis 505a and a second axis 505b are provided that are at right angles to each other. The first axis 505a is used as a reference position. A worker that operates the manufacturing apparatus 500 observes through the microscope 505 and operates the first adjusting mechanism 152 while checking the position of the clad film 6. FIGS. 17A to 17C are explanatory views showing a state where an end of the clad film 6 is aligned with the first axis 505a in the microscope 505. FIG. 17A shows a state observed through the microscope 505. FIG. 17B shows the clad film 6 viewed from above. FIG. 17C shows the clad film 6 viewed from the side. The worker operates the first adjusting mechanism 152 so that the end of the clad film 6 is aligned with the axis 505a used as a reference position as shown in FIG. 17A.

After the positioning of the shape retaining support 151 is completed, the pressing head 21 and the fourth stage 150 are brought into a state where they face each other as shown in FIGS. 18A and 18B. To bring them into such a state, the first stage 502 is moved in the left-right direction. The pressing head 21 is lowered toward the shape retaining support 151, and the clad film 6 held by the shape retaining support 151 is transferred to the elastic body 20.

Figure 20A:
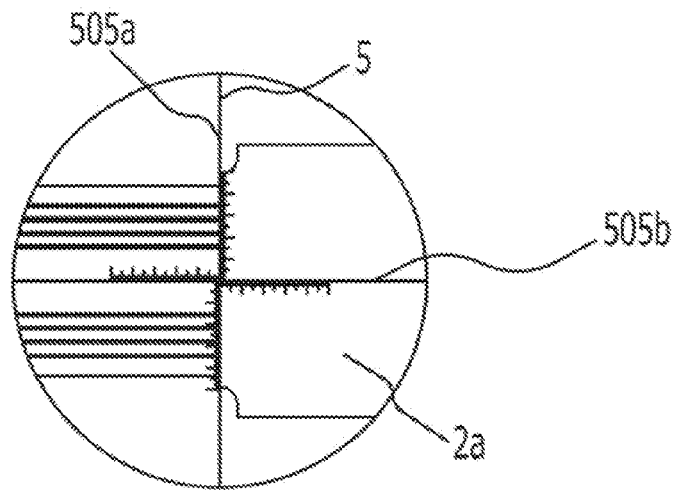
FIGS. 20A to 20C show a state where a corner line of the clad structure is aligned with the axis in the microscope.
Figure 20B:
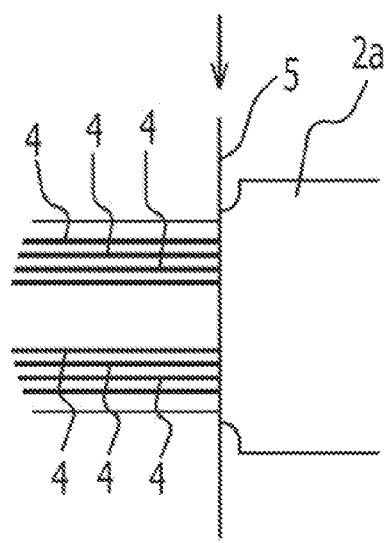
Figure 20C:
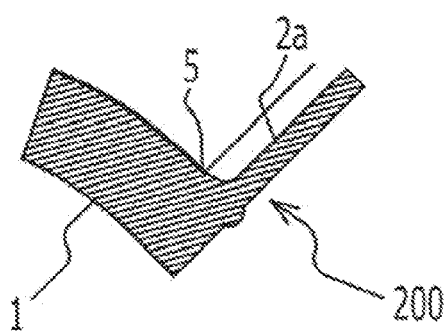

Next, as shown in FIGS. 19A and 19B, the third stage 100 holding the clad structure 1 is placed opposite the microscope 505. The microscope 505 is fixed and keeps the state when the positioning of the shape retaining support 151 is performed. To place the third stage 100 and the microscope 505 opposite each other, the first stage 502 is moved in the left-right direction. The worker observes through the microscope 505 and operates the second adjusting mechanism 101 while checking the position of the clad structure 1. FIGS. 20A to 20C are explanatory views showing a state where the corner line 5 of the clad structure 1 is aligned with the first axis 505a in the microscope 505. FIG. 20A shows a state observed through the microscope 505. FIG. 20B shows the clad structure 1 viewed from above. FIG. 20C shows the section of the clad structure 1 viewed from the side. The worker operates the second adjusting mechanism 101 so that the corner line 5 of the clad structure 1 is aligned with the axis 505a used as a reference position as shown in FIG. 20A.

After the positioning of the clad structure 1 is completed, the attachment of the clad film 6 to the clad structure 1 is performed. This step is performed with the pressing head 21 and the third stage 100 placed opposite each other as shown in FIGS. 21A and 21B. To place the pressing head 21 and the third stage 100 opposite each other, the first stage 502 is moved in the left-right direction. After the third stage 100 is moved, the pressing head 21 is lowered, and the clad film 6 is attached to the curved surface of the clad structure 1 while the pressing head 21 is pressed against the curved surface of the clad structure 1. By preliminarily dropping the liquid core material near the corner line 5 of the clad structure 1, the grooves 4 are filled with the liquid core material as the pressing head 21 is pressed. After the grooves 4 are filled with the liquid core material and the attachment of the clad film 6 is completed, the UV irradiator 507 irradiates the liquid core material with ultraviolet light and thereby cures the liquid core material. Thus, the optical waveguides 202 are formed.

Figure 22A:
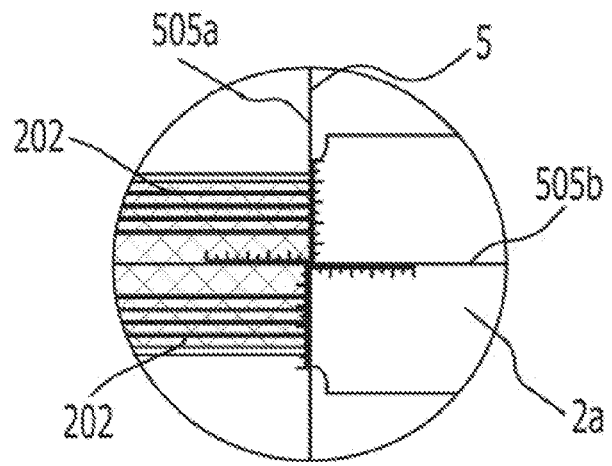
FIGS. 22A to 22C show the corner line of the clad structure to which the clad film is attached observed through the microscope.
Figure 22B:
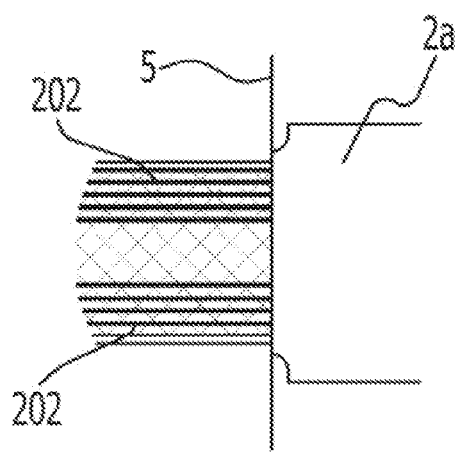
Figure 22C:
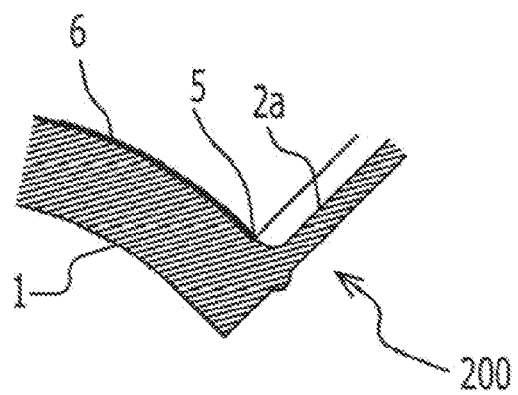

Through the above-described process, the clad film 6 can be disposed on the clad structure 1 with a high degree of accuracy. FIG. 22A shows the corner line 5 of the clad structure 1 to which the clad film 6 is attached observed through the microscope 505. FIG. 22B shows the vicinity of the corner line 5 of the clad structure 1 viewed from above. FIG. 22C shows the section of the vicinity of the corner line 5 of the clad structure 1 viewed from the side. Thus, the end of the clad film 6 can be aligned with the ends of the optical waveguides 202. According to the manufacturing apparatus 500 disclosed in this specification, the clad film 6 can be easily positioned, and therefore the contamination, breakage, and so forth of the clad film 6 caused by repeatedly performing positioning can be substantially prevented.

In this embodiment, the worker observes through the microscope 505 and operates the first adjusting mechanism 152 and the second adjusting mechanism 101. However, these may be performed automatically. In order to improve the formability of the clad film 6, the side blocks 154 and/or the pusher block 54 may have a heating function. The alignment may be performed after the clad film 6 is transferred to the elastic body 20.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

The invention claimed is:

1. A manufacturing apparatus for an optical waveguide structure including a clad structure having grooves in a curved surface thereof and a clad film attached to the curved surface, the apparatus comprising:

a clad film shape retaining portion that has a curved surface along which the clad film is held;

a position checking portion that checks the position of the clad film on the clad film shape retaining portion;

a first position adjusting portion that adjusts the position of the clad film shape retaining portion so that the clad film on the clad film shape retaining portion is disposed at a reference position while checking the position of the clad film with the position checking portion;

a pressing portion having an elastic body that has a curved surface corresponding to the curved surface of the clad film shape retaining portion and to which the clad film held by the clad film shape retaining portion is transferred and that presses the transferred clad film against the curved surface of the clad structure;

a clad structure holding portion that holds the clad structure and can face the position checking portion and the pressing portion in place of the clad film shape retaining portion; and a second position adjusting portion that adjusts the position of the clad structure holding portion so that the clad structure held by the clad structure holding portion is disposed at the reference position while checking the position of the clad structure with the position checking portion.

2. The manufacturing apparatus according to claim 1 further comprising a clad film feeding portion that cuts out the clad film of a desired size from a clad film sheet while feeding the clad film onto the curved surface of the clad film shape retaining portion.

3. The manufacturing apparatus according to claim 1 further comprising a guiding portion to guide the clad film held by the clad film shape retaining portion, the guide portion being located lateral to the clad film shape retaining portion.

4. A manufacturing method for an optical waveguide structure including a clad structure having grooves in a curved surface thereof and a clad film attached to the curved surface, the method comprising:

holding the clad film with a clad film shape retaining portion that has a curved surface along which the clad film is held;

adjusting the position of the clad film shape retaining portion so that the clad film on the clad film shape retaining portion is disposed at a reference position while checking the position of the clad film with a position checking portion that checks the position of the clad film on the clad film shape retaining portion;

placing the clad film shape retaining portion opposite a pressing portion having an elastic body having a curved surface corresponding to the curved surface of the clad film shape retaining portion, and transferring the clad film held by the clad film shape retaining portion to the pressing portion;

placing a clad structure holding portion holding the clad structure opposite the position checking portion in a state where the position of the clad film shape retaining portion is adjusted, and adjusting the position of the clad structure holding portion so that the clad structure held by the clad structure holding portion is disposed at the reference position while checking the position of the clad structure with the position checking portion; and placing the clad structure holding portion the position of which is adjusted opposite the pressing portion, and attaching the clad film to the curved surface of the clad structure while pressing the pressing portion against the curved surface of the clad structure.

5. The manufacturing method according to claim 4, wherein when holding the clad film with the clad film shape retaining portion, the clad film is cut out from a clad film sheet while the clad film is fed onto the curved surface of the clad film shape retaining portion.

* * * * *